US008982770B2

(12) United States Patent
Sugiyama et al.

(10) Patent No.: US 8,982,770 B2
(45) Date of Patent: Mar. 17, 2015

(54) RELAY STATION, WIRELESS RELAY SYSTEM, AND ACCESS CONTROL METHOD IN THE SYSTEM THAT PERFORM RANDOM ACCESS IN ACCORDANCE WITH TRANSMISSION RIGHT

(75) Inventors: Takatoshi Sugiyama, Yokosuka (JP); Daisuke Umehara, Kyoto (JP); Masaaki Tanaka, Kyoto (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 59 days.

(21) Appl. No.: 13/501,960

(22) PCT Filed: Sep. 28, 2010

(86) PCT No.: PCT/JP2010/066789
§ 371 (c)(1),
(2), (4) Date: Apr. 13, 2012

(87) PCT Pub. No.: WO2011/048915
PCT Pub. Date: Apr. 28, 2011

(65) Prior Publication Data
US 2012/0201193 A1    Aug. 9, 2012

(30) Foreign Application Priority Data

Oct. 23, 2009   (JP) ................................. 2009-244526

(51) Int. Cl.
*H04B 7/14*        (2006.01)
(Continued)

(52) U.S. Cl.
CPC .............. *H04W 72/04* (2013.01); *H04B 7/155* (2013.01); *H04B 7/15521* (2013.01);
(Continued)

(58) Field of Classification Search
CPC .... H04B 7/2606; H04B 7/15; H04B 7/15507; H04B 7/15542; H04B 7/2681; H04B 7/15521; H04B 7/2656; H04W 56/00; H04W 56/001; H04W 84/005; H04W 88/04; H04W 74/88; H04W 74/083; H04W 84/047
USPC .......................... 370/315, 350, 338, 462, 458; 455/422.1, 450, 7
See application file for complete search history.

(56) References Cited

U.S. PATENT DOCUMENTS 7,042,897 B1 * 5/2006 Sivaprakasam et al. ...... 370/462
(Continued)

FOREIGN PATENT DOCUMENTS

CN          1983863 A      6/2007
(Continued)

OTHER PUBLICATIONS

Umehara, D.; Hirano, T.; Denno, S.; Morikura, M., "Throughput Analysis of Wireless Relay Slotted ALOHA Systems with Network Coding," Global Telecommunications Conference, 2008. IEEE GLOBECOM 2008. IEEE , vol., no., pp. 1,5, Nov. 30, 2008-Dec. 4, 2008.*
(Continued)

*Primary Examiner* — Edan Orgad
*Assistant Examiner* — Ivan O Latorre
(74) *Attorney, Agent, or Firm* — Harness, Dickey & Pierce, P.L.C.

(57) ABSTRACT

Provided is a wireless relay system that improves system throughput between terminal stations and flexibly makes system throughput variable with respect to short-term traffic fluctuations. In the wireless relay system, a plurality of relay stations relay communication between two terminal stations that perform random access. The terminal stations and the relay stations include a slot synchronization unit, a time synchronization unit, and a transmission unit. The slot synchronization unit synchronizes slot timing of a time slot indicating a unit time. The time synchronization unit performs time synchronization for synchronization of the slot timing. The transmission unit transmits a transmission packet to a wireless line in synchronization with the slot timing. A transmission right is allocated for at least one time slot to each of a plurality of groups which are configured so that a group of a terminal station or a relay station and a group of an adjacent terminal station or an adjacent relay station are different from each other. The transmission unit transmits the transmission packet to the wireless line only in a time slot in which the transmission right is allocated to the group to which the terminal station or the relay station belongs.

8 Claims, 16 Drawing Sheets

(51) Int. Cl.
*H04W 72/04* (2009.01)
*H04B 7/155* (2006.01)
*H04B 7/26* (2006.01)
*H04W 56/00* (2009.01)
*H04W 84/04* (2009.01)

(52) U.S. Cl.
CPC ............ *H04B 7/2606* (2013.01); *H04B 7/2656* (2013.01); *H04W 56/00* (2013.01); *H04W 84/047* (2013.01)
USPC .......................... 370/315; 370/321; 455/11.1

(56) References Cited

U.S. PATENT DOCUMENTS

| | | | | |
|---|---|---|---|---|
| 2002/0193945 | A1* | 12/2002 | Tan et al. | 701/213 |
| 2004/0146043 | A1* | 7/2004 | Hiraoka et al. | 370/350 |
| 2008/0220790 | A1* | 9/2008 | Cai et al. | 455/450 |
| 2009/0154431 | A1* | 6/2009 | Tang et al. | 370/338 |
| 2009/0209262 | A1* | 8/2009 | Stamoulis et al. | 455/450 |
| 2009/0213815 | A1* | 8/2009 | Sherman et al. | 370/336 |
| 2009/0280797 | A1* | 11/2009 | So et al. | 455/422.1 |
| 2010/0317284 | A1* | 12/2010 | Charbit et al. | 455/7 |

FOREIGN PATENT DOCUMENTS

| | | |
|---|---|---|
| CN | 101110625 A | 1/2008 |
| CN | 101536423 A | 9/2009 |
| WO | 2008/042245 A2 | 4/2008 |

OTHER PUBLICATIONS

I. Gitman, "On the capacity of slotted ALOHA networks and some design problems," IEEE Trans. Commun., No. 3, pp. 305-317, Mar. 1975.*

Notice of Reasons for Rejection, Japanese Patent Application No. 2009-244526, Mar. 12, 2013.

Nakanishi, Kazuki, et al., "The Actual Situation and Problems of Regional Protection System Using Wireless Ad-Hoc Network," The Information of Electronics, Information and Communication Engineers, Technical Report, CS2009-19, pp. 35-40, Jul. 2009.

Takei, Kaori, et al., "System Throughput for Wireless Multihop Access System Employing Network Coding," The Institute of Electronics, Information and Communication Engineers, Proceedings of the 2009 IEICE General Conference, B-7-8, p. 152, Mar. 17-20, 2009.

Tanaka, Masaaki, et al., "A Study on Delay Performance of 3-hop Wireless Relay System Employing Network Coding," The Institute of Electronics, Information and Communication Engineers, 2009 IECE Communications Society Conference Koen Ronbunshu 2, B-7-55, p. 123, Sep. 15-18, 2009.

Mizutani, Keiichi, et al., "Multi-channel Two-way Multi-hop Relay Network Hardware Prototype," The Institute of Electronics, Information and Communication Engineers, Technical Report, SR2009-32, pp. 61-67, Jul. 2009.

First Office Action, Chinese Patent Application No. 201080046638 9.9, Mar. 4, 2014.

* cited by examiner

FIG. 17 (BACKGROUND ART)

| TIME-SLOT SEQUENCE | TS81 (1) | TS82 (2) | TS83 (3) | TS84 (4) | TS85 (5) | TS86 (6) | TS87 (7) | TS88 (8) | TS89 (9) | TS90 (10) |
|---|---|---|---|---|---|---|---|---|---|---|
| TERMINAL STATION 110A | transmission in accordance with random access protocol in time slot of any timing | | | | | | | | | |
| RELAY STATION 130A | | transmission in accordance with random access protocol in time slot of any timing | | | | | | | | |
| RELAY STATION 130B | | | transmission in accordance with random access protocol in time slot of any timing | | | | | | | |
| RELAY STATION 130C | | | | transmission in accordance with random access protocol in time slot of any timing | | | | | | |
| TERMINAL STATION 110B | | | | | transmission in accordance with random access protocol in time slot of any timing | | | | | |

⋯⋯⋯

RELAY STATION, WIRELESS RELAY SYSTEM, AND ACCESS CONTROL METHOD IN THE SYSTEM THAT PERFORM RANDOM ACCESS IN ACCORDANCE WITH TRANSMISSION RIGHT

CROSS-REFERENCE TO RELATED APPLICATIONS

This application is a 371 U.S. National Stage of International Application No. PCT/JP2010/066789, filed on Sep. 28, 2010, which claims priority to Japanese Patent Application No. 2009-244526, filed Oct. 23, 2009. The disclosures of the above applications are incorporated herein by reference.

TECHNICAL FIELD

The present invention relates to a wireless relay scheme of decreasing the collision probability of packet signals due to media access control between relay stations and of improving system throughput when communication is performed between terminal stations via multistage relay stations in a digital wireless-relay communication system using random access as a basic media access control scheme.

Priority is claimed on Japanese Patent Application No. 2009-244526 filed Oct. 23, 2009, and the content of which is incorporated herein by reference.

BACKGROUND ART

There is a communication protocol of a wireless relay scheme that is applied to a digital wireless-relay communication system using random access as a basic media access control scheme.

For example, a communication protocol of a wireless relay scheme reported in Non-patent Document 1 is based on Association of Radio Industries and Businesses (ARIB) standard STD-T67, which is a standard protocol for a specified low-power radio. An example of a configuration of a wireless relay system and time-slot control of packets in accordance with this conventional example is illustrated in FIGS. 16 and 17.

When transmitting a packet, a transmission station senses a carrier before transmission. At this time, if the carrier has been detected, the transmission station returns to a waiting state. If no carrier has been detected, the transmission station acquires a time to be set in a transmission delay timer using a random number, sets the acquired time in the transmission delay timer, and waits for the timer to time out. If the transmission station has detected the carrier while waiting for the time-out, the transmission station returns to a waiting state. If there is no carrier and the transmission delay timer has timed out, the transmission station initiates packet transmission. In order to secure the reliability of the packet transmission, the transmission station waits for an ACK signal from a partner station. If no ACK signal has been received after the transmission station has waited for a defined time, the transmission station transmits a packet signal up to 7 times. Such a media access control scheme is referred to as a carrier sense multiple access with collision avoidance (CSMA/CA) scheme, and is adopted in the Institute of Electrical and Electronics Engineers (IEEE) 802.11 wireless local area network (LAN) standard, which is a wireless LAN standard. In communication indicated by a two-way arrow in FIG. 16, random access is performed in accordance with CSMA/CA.

It is to be noted that this conventional scheme does not employ network encoding technology for improving system throughput.

In addition, a communication protocol of a wireless relay scheme reported in Non-patent Document 2 adopts a time-division multiple access (TDMA) scheme, which is a scheme that manages a schedule with respect to time slots in a time domain. An example of a configuration of a wireless relay system and time-slot control of packets in accordance with this conventional example is illustrated in FIGS. 18 and 19. This scheme is a wireless relay scheme in which an influence of propagation of radio waves between terminal stations and relay stations is considered, a deployment distance between the respective stations is considered so that the ratio waves of the respective stations do not interfere with each other, time slots to be used by the respective stations are temporally separated when packet collision occurs, and stations that are positioned at sufficiently distant locations are permitted to transmit packets with the same frequency at the same time. In communication indicated by a two-way arrow in FIG. 18, access scheduled in accordance with TDMA is performed.

It is to be noted that this conventional scheme employs network encoding technology for improving system throughput.

PRIOR ART DOCUMENTS

Non-Patent Documents

Non-patent Document 1: Kazuki Nakanishi, Shinji Horio, Koki Kanai, Masaaki Niimura, Hisayoshi Kunimune, Eiki Motoyama, and Yasushi Fuwa, "The Actual Situation and Problems of Regional Protection System Using Wireless Ad-Hoc Network," The Institute of Electronics, Information and Communication Engineers, Technical Report, CS2009-19, pp. 35-40, July 2009.

Non-patent Document 2: Kaori Takei, Daisuke Umehara, Satoshi Denno, Masahiro Morikura, Nobuaki Otsuki, and Takatoshi Sugiyama, "System Throughput for Wireless Multihop Access System Employing Network Coding," The Institute of Electronics, Information and Communication Engineers, General Conference, B-7-8, p. 152, March, 2009.

DISCLOSURE OF INVENTION

Problems to be solved by the Invention

However, in Non-patent Document 1, as illustrated in FIG. 16, relay stations 130A, 130B, and 130C, and terminal stations 110A, 110B, and 110C perform autonomously distributed random access control. In terms of contention for time slots in which the respective stations are connected, only the control of collision avoidance by carrier detection is performed. For this reason, there is a problem in that if traffic is increased, system throughput is decreased due to packet collisions. Specifically, when detecting the carrier, a transmission station transmits a packet after a randomly set waiting time has elapsed. However, if the number of transmitting stations or an amount of traffic is increased, the transmitting stations are likely to have the same waiting time and the number of packet collisions is increased between the transmitting stations. Although a packet lost due to the packet collision is retransmitted by retransmission control, system throughput and delay time performance of packets are deteriorated.

In addition, in Non-patent Document 2, as shown in FIG. 19, the entire traffic is scheduled so that no packet collision occurs between respective stations. Non-patent Document 2 discloses a system for avoiding packet collisions by allocating fixed slots to terminal stations 210A and 210B in accordance with time-division multiple access. Such a system is suitable when the terminals 210A and 210B constantly transmit certain fixed traffic. However, packet transmission/reception timings of all stations including relay stations 230A, 230B, and 230C should be changed when the terminal stations 210A and 210B transmit time-variant traffic. In addition, because the system manages the entire traffic and notifies the respective stations of a traffic condition, the system becomes complex and flexibility becomes problematic with respect to traffic fluctuations such as a delay time occurring in control for changing transmission/reception timings of time slots.

The present invention has been made in view of such circumstances, and provides an access control system, an access control method, a relay station apparatus, a terminal station apparatus, a transmitting side processing method, a receiving side processing system, and a receiving side processing method by a wireless relay scheme that improves system throughput between terminal stations and flexibly makes system throughput variable with respect to short-term traffic fluctuations of the terminal stations.

Means for Solving the Problems

The present invention for solving the above-described problem is a relay station in a wireless relay system in which a plurality of relay stations relay communication between two terminal stations that perform random access, the relay station including: a slot synchronization unit which synchronizes slot timing of a time slot indicating a unit time; a time synchronization unit which performs time synchronization for synchronization of the slot timing; and a transmission unit which transmits a transmission packet to a wireless line in synchronization with the slot timing, wherein a transmission right is allocated for at least one time slot to each of a plurality of groups which are configured so that a group of the relay station and a group of an adjacent terminal station or an adjacent relay station are different from each other, and the transmission unit transmits the transmission packet to the wireless line only in a time slot in which the transmission right is allocated to the group to which the relay station belongs.

In addition, in the relay station, when the number of time slots allocated to the group is more than one, time slots to which transmission rights are assigned may be successively allocated.

In addition, in the relay station, the number of groups may be two, and when the number of time slots allocated to each of the groups is one, a time slot to which a transmission right is assigned may be alternately allocated in accordance with the number of relay stages by the relay stations.

In addition, the relay station may include: an encoding unit which performs network encoding of a packet to be transmitted using the time slot; and a decoding unit which decodes a packet subjected to the network encoding based on the packet transmitted by the relay station itself.

In addition, the present invention is a terminal station in a wireless relay system in which a plurality of relay stations relay communication between two terminal stations that perform random access, the terminal station including: a slot synchronization unit which synchronizes slot timing of a time slot indicating a unit time; a time synchronization unit which performs time synchronization for synchronization of the slot timing; and a transmission unit which transmits a transmission packet to a wireless line in synchronization with the slot timing, wherein a transmission right is allocated for at least one time slot to each of a plurality of groups which are configured so that a group of the terminal station and a group of an adjacent relay station are different from each other, and the transmission unit transmits the transmission packet to the wireless line only in a time slot in which the transmission right is allocated to the group to which the terminal station belongs.

In addition, in the terminal station, when the number of time slots allocated to the group is more than one, time slots to which transmission rights are assigned may be successively allocated.

In addition, in the terminal station, the number of groups may be two, and when the number of time slots allocated to the group is one, a time slot to which a transmission right is assigned may be alternately allocated in accordance with the number of relay stages by the relay stations.

In addition, the terminal station may include: a decoding unit which decodes a packet subjected to network encoding based on a packet transmitted by the terminal station itself.

In addition, the present invention is a wireless relay system in which a plurality of relay stations relay communication between two terminal stations that perform random access, wherein the terminal stations and the relay stations include: a slot synchronization unit which synchronizes slot timing of a time slot indicating a unit time; a time synchronization unit which performs time synchronization for synchronization of the slot timing; and a transmission unit which transmits a transmission packet to a wireless line in synchronization with the slot timing, wherein a transmission right is allocated for at least one time slot to each of a plurality of groups in which a group of a terminal station or a relay station and a group of an adjacent terminal station or an adjacent relay station are different from each other, and the transmission unit transmits the transmission packet to the wireless line only in a time slot in which the transmission right is allocated to the group to which the terminal station or the relay station belongs.

In addition, in the wireless relay system, when the number of time slots allocated to the group is more than one, time slots to which transmission rights are assigned may be successively allocated.

In addition, in the wireless relay system, the number of groups may be two, and when the number of time slots allocated to each of the groups is one, a time slot to which a transmission right is assigned may be alternately allocated in accordance with the number of relay stages by the relay stations.

In addition, in the wireless relay system, the relay stations may include an encoding unit which performs network encoding of a packet to be transmitted using the time slot, and the terminal stations and the relay stations may include a decoding unit which decodes a packet subjected to the network encoding based on the packet transmitted by the terminal stations themselves or the relay stations themselves.

In addition, the present invention is an access control method in a wireless relay system in which a plurality of relay stations relay communication between two terminal stations that perform random access, the method including: a slot synchronization process of synchronizing, by the terminal stations and the relay stations, slot timing of a time slot indicating a unit time; a time synchronization process of performing, by the terminal stations and the relay stations, time synchronization for synchronization of the slot timing; and a transmission process of transmitting, by the terminal stations and the relay stations, a transmission packet to a wireless line in synchronization with the slot timing, wherein a transmission right is allocated for at least one time slot to each of a plurality of groups which are configured so that a group of a terminal station or a relay station and a group of an adjacent terminal station or an adjacent relay station are different from each other, and in the transmission process, the transmission packet is transmitted to the wireless line only in a time slot in which the transmission right is allocated to the group to which the terminal station or the relay station belongs.

In addition, in the access control method, when the number of time slots allocated to the group is more than one, time slots to which transmission rights are assigned may be successively allocated.

In addition, in the access control method, the number of groups may be two, and when the number of time slots allocated to each of the groups is one, a time slot to which a transmission right is assigned may be alternately allocated in accordance with the number of relay stages by relay stations.

In addition, the access control method may include: an encoding process of performing, by the relay stations, network encoding of a packet to be transmitted using the time slot; and a decoding process of decoding, by the terminal stations and the relay stations, a packet subjected to the network encoding based on the packet transmitted by the terminal stations themselves or the relay stations themselves.

Effects of the Invention

In a wireless relay system according to the present invention, a plurality of relay stations relay communication between two terminal stations that perform random access. The terminal stations and the relay stations include a slot synchronization unit, a time synchronization unit, and a transmission unit. The slot synchronization unit synchronizes slot timing of a time slot indicating a unit time. The time synchronization unit performs time synchronization to synchronize the slot timing. The transmission unit transmits a transmission packet to a wireless line in synchronization with the slot timing. A transmission right is allocated for at least one time slot to each of a plurality of groups which are configured so that a group of a terminal station or a relay station and a group of an adjacent terminal station or an adjacent relay station are different from each other. The transmission unit transmits the transmission packet to the wireless line only in a time slot in which the transmission right is allocated to the group to which the terminal station or the relay station belongs.

Thereby, it is possible to improve system throughput between terminal stations by limiting the number of contending stations and allocating slots to decrease the probability of packet collisions between relay stations and/or terminal stations that perform random access.

BRIEF DESCRIPTION OF DRAWINGS

FIG. 17 is a diagram illustrating time-slot control in accordance with the background art.

MODE(S) FOR CARRYING OUT THE INVENTION

Hereinafter, embodiments of the present invention will be described with reference to the drawings.
(First Embodiment)

Figure 1:
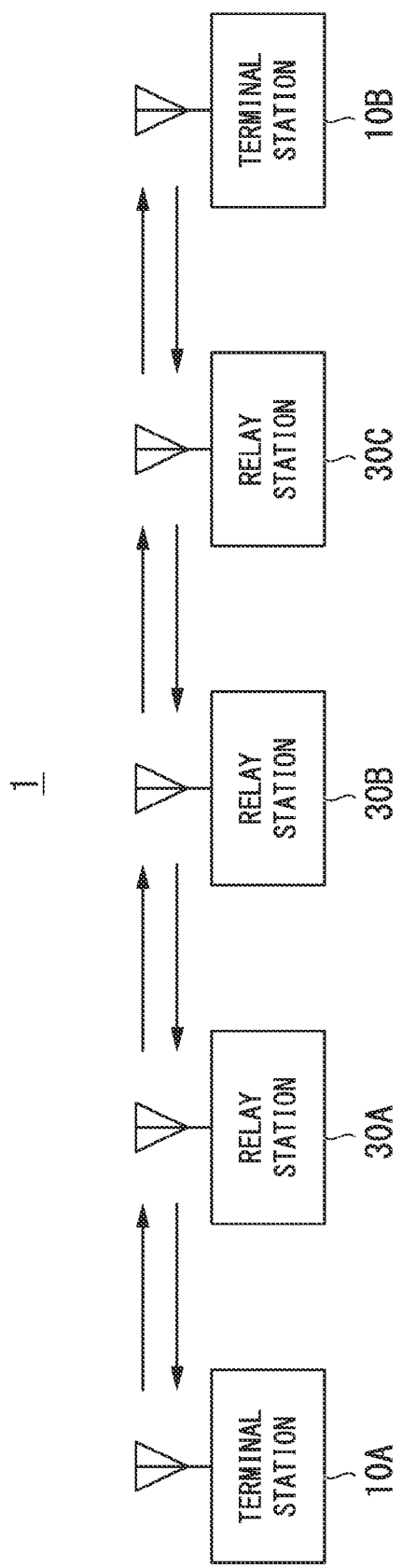
FIG. 1 is a configuration diagram illustrating a configuration of a wireless relay system in accordance with a first embodiment of the present invention.

FIG. 1 is a configuration diagram illustrating a configuration of a wireless relay system in accordance with the present embodiment.

A wireless relay system 1 illustrated in this drawing includes terminal stations 10A and 10B (also collectively referred to as terminal stations 10) and relay stations 30A, 30B, and 30C (also collectively referred to as relay stations 30).

The terminal stations 10A and 10B are wireless terminals of which communication is relayed instead of performing direct communication, and which communicate with each other. The terminal stations 10A and 10B perform a communication process, for example, when they are located in positions between which radio waves do not reach or when they are placed in a situation in which it is difficult to perform direct communication.

The relay stations 30 are arranged between the terminal stations 10A and 10B, and the relay stations 30 relay communication between the terminal stations 10A and 10B. In the wireless relay system 1 illustrated in this drawing, the relay stations 30A, 30B, and 30C are arranged sequentially from the terminal station 10A to the terminal station 10B. It is to be noted that the number of the relay stations 30 needs to be one or more.

In addition, the wireless relay system 1 is a system in which traffic is generated between the terminal stations 10A and 10B and the terminal stations 10A and 10B perform forwarding through the plurality of relay stations 30 so as to perform transmission to a partner station in a remote place. Although it is assumed that no traffic is generated from the relay stations 30 in the present embodiment, the present embodiment is applicable even when traffic is generated from the relay stations 30. In addition, although the case in which only one radio frequency channel is used will be described, the present embodiment is applicable to the case in which there are a plurality of wireless channels.

The present embodiment is directed to media access control (MAC) which is targeted for two-way traffic between the terminal stations 10A and 10B. For example, the present embodiment aims at a slotted ALOHA scheme as a media access control scheme to be adopted. Therefore, it is assumed that slot synchronization and time synchronization are established among all the terminal stations 10 and all the relay stations 30 through a global positioning system (GPS) or the like. In addition, it is assumed that interference by radio waves of a station itself affects adjacent station(s), but does not affect the next adjacent station(s). Therefore, the station itself and the next adjacent station(s) can simultaneously transmit packet signals of the same frequency channel.

Figure 2:
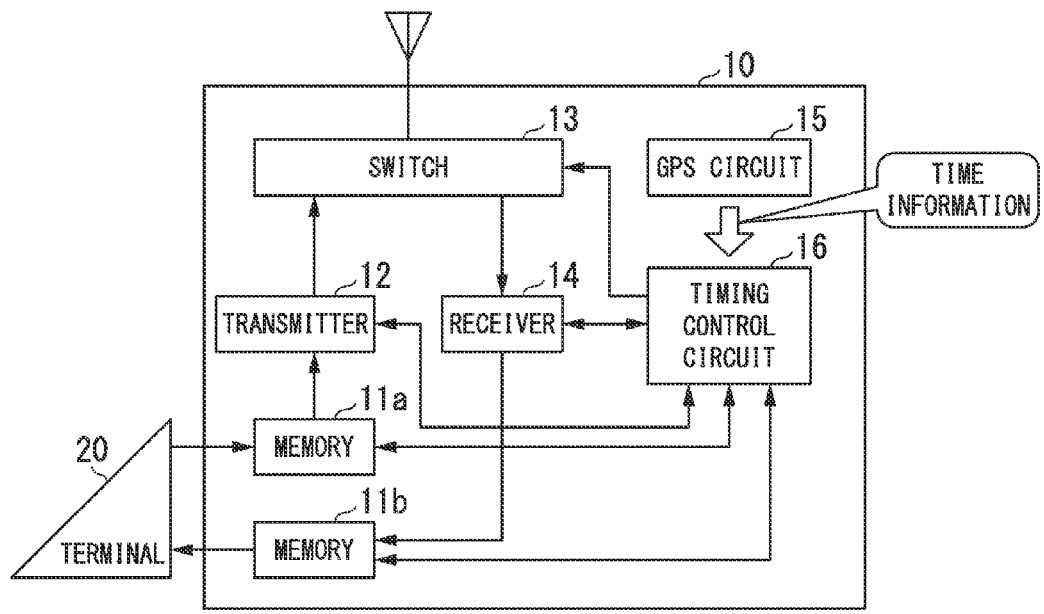
FIG. 2 is a schematic block diagram illustrating a configuration of a terminal station 10 in accordance with this embodiment.

FIG. 2 is a schematic block diagram illustrating a configuration of a terminal station 10 in accordance with the present embodiment.

The terminal station 10 transmits/receives a data signal to/from a terminal 20 via memories 11a and 11b.

The terminal station 10 includes the memories 11a and 11b, a transmitter 12, a switch 13, a receiver 14, a GPS circuit 15, and a timing control circuit 16. The memories 11a and 11b are storage units that each function as buffers in communication for the connected terminal 20. The memory 11a stores a packet (transmission packet) supplied from the terminal 20 and transmitted to a wireless line. The memory 11b stores a packet (received packet) supplied from the wireless line and transmitted to the terminal 20. When the memories 11a and 11b are collectively indicated, they are referred to as memories 11.

In synchronization with a time slot formed in synchronization with a supplied timing signal, the transmitter 12 modulates the transmission packet stored in the memory 11a and transmits the modulated transmission packet to the wireless line. In accordance with a transmission right for transmission to the wireless line using the time slot, the transmitter 12 allocates the transmission packet and controls transmission to the wireless line.

The switch 13 selectively switches a target to which an antenna is connected between the transmitter 12 and the receiver 14.

The receiver 14 demodulates a modulated signal received from the wireless line, and extracts a packet (received packet) from the received signal in synchronization with a time slot formed in synchronization with the supplied timing signal. The receiver 14 extracts received packets in order corresponding to packets transmitted in transmission order that is defined in accordance with transmission rights for transmissions to the wireless line using time slots. The receiver 14 stores the extracted received packets in the memory 11b.

The GPS circuit 15 receives radio waves from a satellite of a GPS system (not illustrated), and extracts time information. The GPS circuit 15 inputs the time information from the satellite to the timing control circuit 16 so as to establish slot synchronization of a wireless section of the terminal station 10. The timing control circuit 16 generates timing signals based on the time information supplied from the GPS circuit 15. The timing control circuit 16 supplies the generated timing signals to the memories 11a and 11b, the transmitter 12, the switch 13, and the receiver 14, and synchronizes timing within the terminal station 10. In addition to the time synchronization based on the supplied time information, the timing control circuit 16 can also synchronize timing of a time slot during communication using a wireless signal.

In addition, the timing control circuit 16 monitors the states of the memories 11a and 11b, and makes the transmitter 12 perform transmission in accordance with certain transmission probability in a time slot to which a transmission right is allocated when information is accumulated in the memory 11a (a memory at a transmitting side). In a time slot in which no transmission is performed, the terminal station 10 constantly operates in a receiving state so that the receiver 14 performs a process of receiving a packet signal addressed to the station itself.

It is to be noted that the terminal station 10 which supports network encoding as will be described later also has the following functions, in addition to the configuration shown above.

The receiver 14 includes a decoding unit (DEC) 14a (FIG. 6) which decodes a received packet generated by demodulation based on information on a transmission packet transmitted in advance and stored in the memory 11a.

The decoding unit 14a carries out an exclusive OR operation process on the received packet and the transmission packet to generate a decoded packet.

Figure 3:
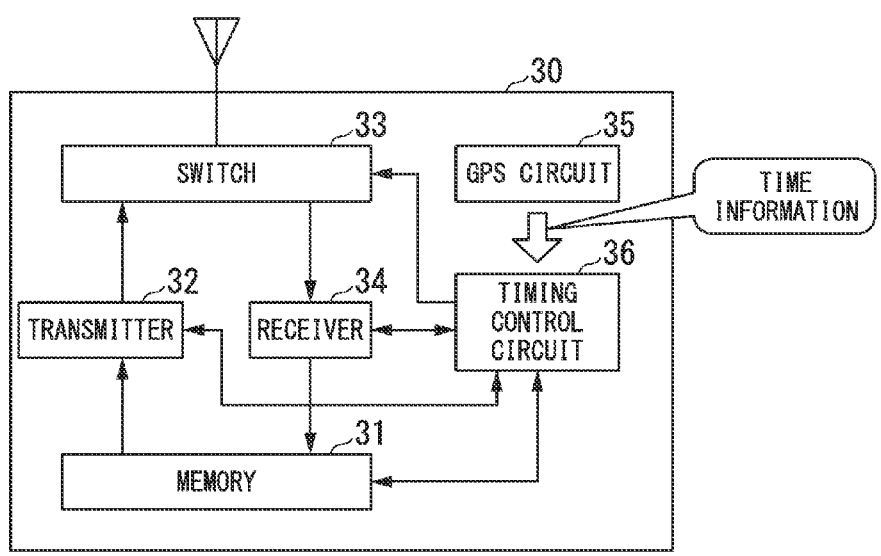
FIG. 3 is a schematic block diagram illustrating a configuration of a relay station 30 in accordance with this embodiment.

FIG. 3 is a schematic block diagram illustrating a configuration of the relay station 30 in accordance with the present embodiment.

The relay station 30 transmits/receives a communication signal to/from the terminal station 10 or other relay stations 30 via a memory 31.

The relay station 30 includes the memory 31, a transmitter 32, a switch 33, a receiver 34, a GPS circuit 35, and a timing control circuit 36.

The memory 31 is a storage unit that functions to temporarily store packets received from a relay line and functions as a buffer until the packets are transmitted.

The transmitter 32 modulates a transmission packet stored in the memory 31 in synchronization with a time slot formed in synchronization with a supplied timing signal, and transmits the modulated transmission packet to the wireless line. The transmitter 32 allocates a transmission packet in accordance with a transmission right for transmission to the wireless line using a time slot, and controls transmission to the wireless line.

The switch 33 selectively switches a target to which an antenna is connected between the transmitter 32 and the receiver 34.

The receiver 34 demodulates a modulated signal received from the wireless line, and extracts a packet (received packet) from the received signal in synchronization with a time slot formed in synchronization with the supplied timing signal. The receiver 34 extracts received packets in order corresponding to packets transmitted in the transmission order defined in accordance with transmission rights for transmissions to the wireless line using time slots. The receiver 34 stores the extracted received packets in the memory 31.

The GPS circuit 35 receives radio waves from the satellite of the GPS system (not illustrated), and extracts time information. The GPS circuit 35 inputs the time information from the satellite to the timing control circuit 36 so as to establish slot synchronization of a wireless section of the relay station 30.

The timing control circuit 36 generates timing signals based on the time information supplied from the GPS circuit 35. The timing control circuit 36 supplies the generated timing signals to the memory 31, the transmitter 32, the switch 33, and the receiver 34, and synchronizes timing within the relay station 30. In addition to time synchronization based on the supplied time information, the timing control circuit 36 can also synchronize timing of a time slot during communication using a wireless signal.

Moreover, in addition to slot synchronization for the slotted ALOHA scheme, the timing control circuit 36 performs transmission in accordance with random access control only in a slot having a transmission right by determining whether or not a slot has a transmission right. The receiver 34 constantly operates in a slot that does not have a transmission right or in a state in which there is no transmission even when there is a transmission right. With respect to the transmission right, a time slot to which the transmission right is assigned is predetermined based on an average traffic amount.

It is to be noted that the terminal station 30 that supports network encoding as will be described later also has the following functions, in addition to the configuration shown above.

The receiver 34 includes a decoding unit (DEC) 34a (FIG. 6) which decodes a received packet generated by demodulation based on information on a transmission packet transmitted in advance and stored in the memory 31.

The decoding unit 34a carries out an exclusive OR operation process on the received packet and the transmission packet to generate a decoded packet.

The transmitter 32 includes an encoding unit (ENC) 32a (FIG. 6) which performs an encoding process when packets received via two wireless lines are stored in the memory 31.

The encoding unit 32a carries out an exclusive OR operation process on the two received packets stored in the memory 31 to generate an encoded packet.

The transmitter 32 modulates the encoded packet and transmits the modulated packet to the wireless line.

Figure 4:
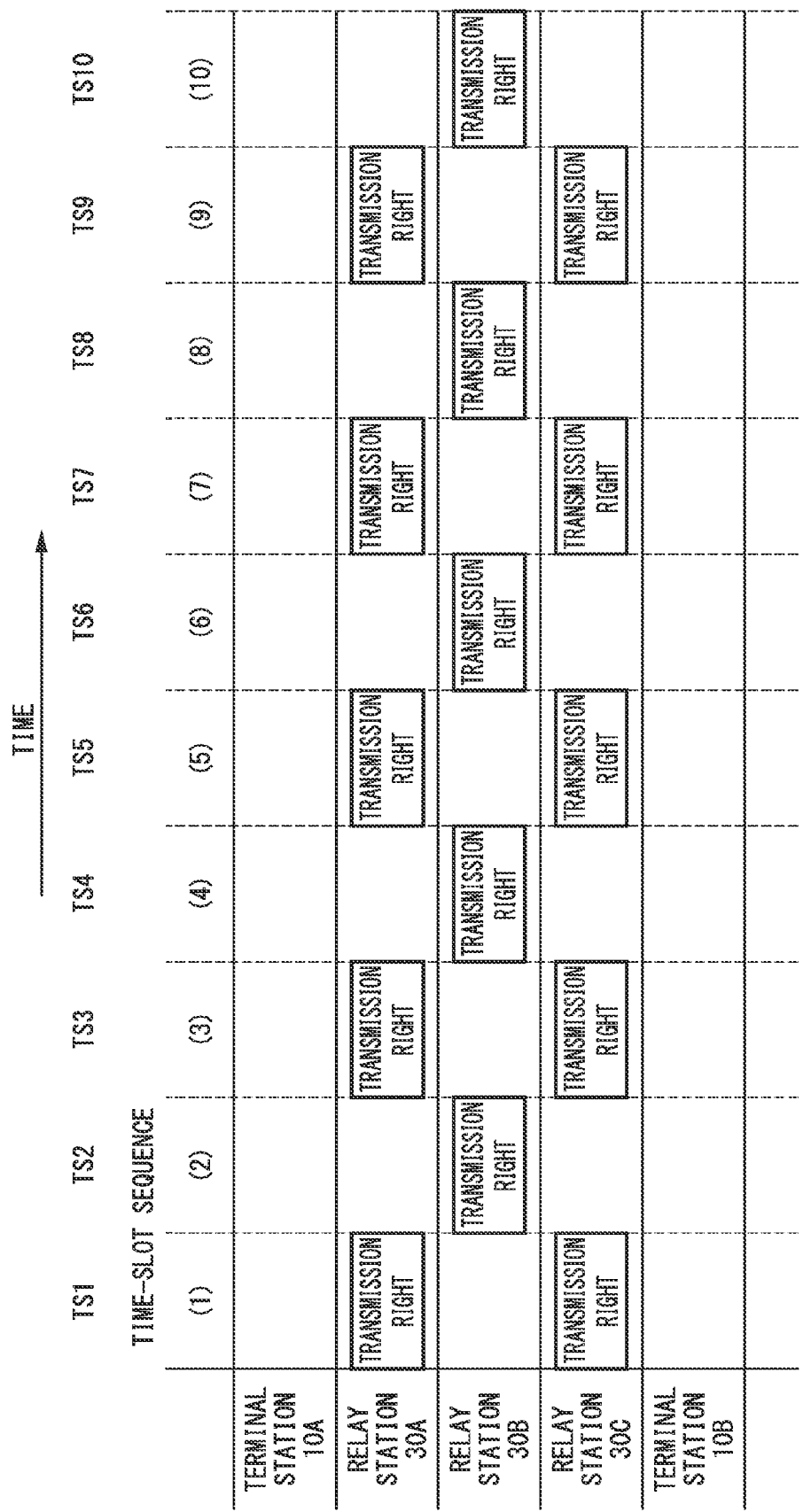
FIG. 4 is a diagram illustrating time-slot control in accordance with this embodiment.

FIG. 4 is a diagram illustrating time-slot control of the present embodiment.

This drawing illustrates time slots in which the terminal stations 10 and the relay stations 30 illustrated in FIG. 1 acquire transmission rights allocated to timings of a time-slot sequence including TS1 to TS10.

The terminal stations 10 and the relay stations 30 illustrated in FIG. 1 establish time synchronization of a time slot by extracting time information supplied by radio waves of the GPS, and, if there is a packet signal to be transmitted by the station itself for each time slot, transmit the packet signal in accordance with certain transmission probability. In this case, in the conventional random access control, the packet signal can be transmitted in any time slot. In contrast, the present embodiment selects a control scheme which permits transmission by random access only in a time slot to which a transmission right is assigned.

Two types of systems will be shown for a wireless relay scheme applied to the present embodiment.

A first system is a normal system without the use of an encoding scheme called network encoding.

Figure 5:
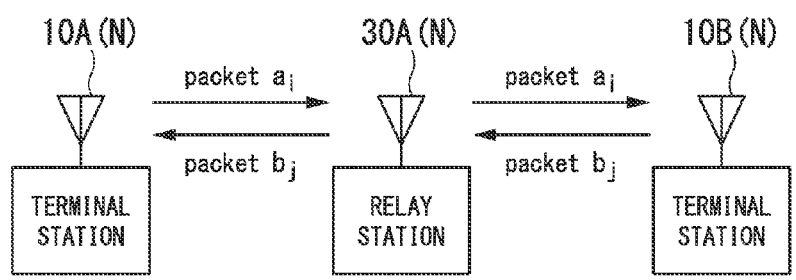
FIG. 5 is a block diagram illustrating two-way packet transmissions in a system without the use of network encoding as an encoding scheme in this embodiment.

FIG. 5 is a diagram illustrating two-way packet transmissions in a system in which the encoding scheme called the network encoding is not used.

In the case of the system without network encoding, the two-way packet transmissions are completed using 4 time slots. That is, necessary transmissions are transmission of a packet $a_i$ from a terminal station 10A(N) to a relay station 30A(N), transmission of the packet $a_i$ from the relay station 30A(N) to a terminal station 10B(N), transmission of a packet $b_j$ from the terminal station 10B(N) to the relay station 30A (N), and transmission of the packet $b_j$ from the relay station 30A(N) to the terminal station 10A(N). Because allocations to different time slots are necessary for the respective transmissions, four time slots are used.

A second system is a system using the encoding scheme called the network encoding.

Figure 6:
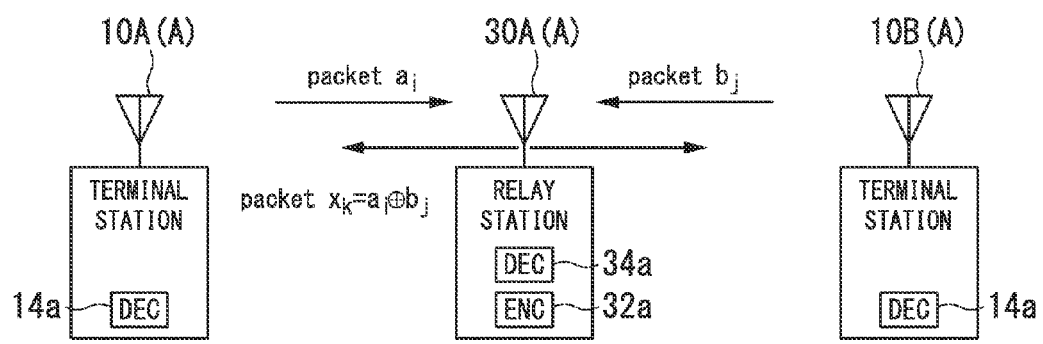
FIG. 6 is a block diagram illustrating two-way packet transmissions in a system using network encoding as an encoding scheme in this embodiment.

FIG. 6 is a block diagram illustrating two-way packet transmissions in the system using the encoding scheme called the network encoding.

Packet signals transmitted from the terminal stations 10A (A) and 10B(A) are received by the relay station 30A(A), and the packet signals received by the relay station 30A(A) are subjected to a logic process of a bitwise exclusive OR to perform encoding. This is referred to as the network encoding. An encoded packet signal $(x_k)$ by the network encoding is transmitted from the relay station 30A(A) to the two terminal stations in a broadcast mode. It is assumed that the terminal station 10A(A) receiving the encoded packet signal $(x_k)$ stores a packet signal ($a_i$ in this case) transmitted by the station itself. Therefore, it is possible to receive a packet signal $(b_j)$ of a desired partner station by carrying out the exclusive OR process again on the received encoded packet signal $(x_k)$ and the packet signal ($a_i$ in this case) transmitted by the station itself.

In accordance with a similar operation, the terminal station 10B(A) can also receive the packet signal $(a_i)$ of the partner station. Therefore, two-way packet transmissions using a total of three time slots are possible by performing the network encoding, and the throughput performance is improved.

The embodiments to be described below are also operative for the case in which the network encoding is performed and for the case in which the network encoding is not performed.

(Second Embodiment)

The assignment of transmission rights in a wireless relay system in accordance with the present embodiment will be shown.

Figure 7:
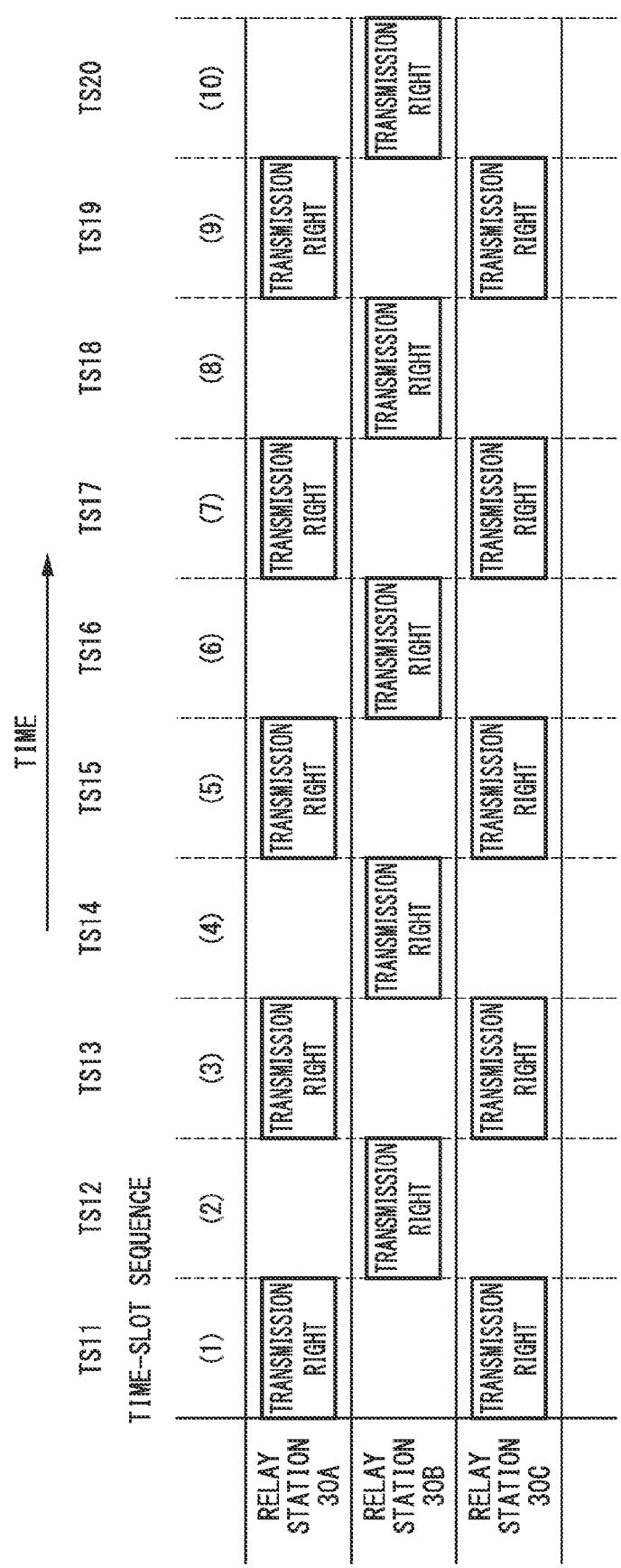
FIG. 7 is a timing chart illustrating the use of time slots of a wireless relay system in accordance with a second embodiment of the present invention.

FIG. 7 is a timing chart illustrating the use of time slots of the wireless relay system in accordance with the present embodiment.

Relay stations 30 illustrated in this drawing are controlled by a wireless relay scheme in which an odd-numbered relay station 30 can only perform transmission at a time of an odd-numbered time slot, and an even-numbered relay station 30 can only perform transmission at a time of an even-numbered time slot. This scheme is applied to a model in which radio waves transmitted by a station itself interferes with those of an adjacent station, but the radio waves of the station itself do not interfere with those of a next adjacent station, thereby making it possible to avoid packet collisions between the relay stations 30 even when each relay station 30 transmits a packet in accordance with the random access scheme.

That is, in the embodiment illustrated in this drawing, three relay stations 30 are divided into two groups so that relay stations between which radio waves interference with each other are not adjacent to each other. The relay stations 30A and 30C are included in a first group and the relay station 30B is included in a second group.

Transmission rights for transmissions in different time slots are assigned to the respective groups, and one time slot is allocated to one of the groups on a time-slot by time-slot basis.

A transmission right for permitting only the relay station(s) 30 belonging to one group to perform transmission is assigned to the time slot, and the transmission rights are assigned in accordance with order of transmission corresponding to the order of allocation of time slots.

In a time slot TS11, the transmission right is assigned to the relay stations 30A and 30C, and in a time slot TS12, the transmission right is assigned to the relay station 30B. Thereafter, similar assignment of the transmission right is alternately iterated.

(Third Embodiment)

The assignment of transmission rights in a wireless relay system in accordance with the present embodiment will be shown.

Figure 8:
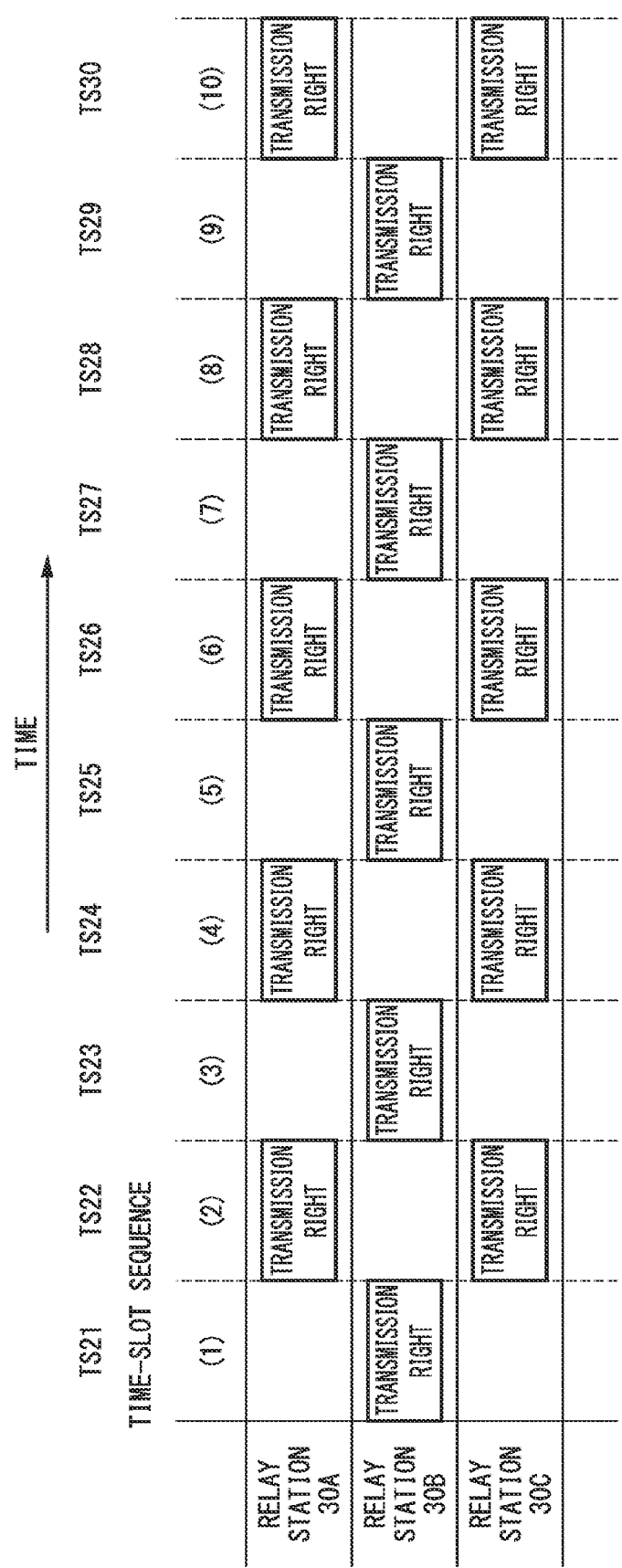
FIG. 8 is a timing chart illustrating the use of time slots of a wireless relay system in accordance with a third embodiment of the present invention.

FIG. 8 is a timing chart illustrating the use of time slots of the wireless relay system in accordance with the present embodiment.

Relay stations 30 illustrated in this drawing are controlled by a wireless relay scheme in which an even-numbered relay station 30 can only perform transmission at a time of an odd-numbered time slot, and an odd-numbered relay station 30 can only perform transmission at a time of an even-numbered time slot. This scheme is applied to a model in which radio waves transmitted by a station itself interfere with those of an adjacent station, but the radio waves of the station itself do not interference with those of a next adjacent station, thereby making it possible to avoid packet collisions between the relay stations 30 even when each relay station 30 transmits a packet in accordance with the random access scheme.

That is, in the embodiment illustrated in this drawing, three relay stations 30 are divided into two groups so that relay stations between which radio waves interfere with each other are not adjacent to each other. The relay stations 30A and 30C are included in a first group and the relay station 30B is included in a second group. Transmission rights for transmissions in different time slots are assigned to the respective groups, and one time slot is allocated to one of the groups on a time-slot by time-slot basis.

A transmission right for permitting only the relay station(s) 30 belonging to one group to perform transmission is assigned to the time slot, and the transmission rights are assigned in accordance with order of transmission corresponding to the order of allocation of time slots.

In a time slot TS21, the transmission right is assigned to the relay station 30B. In a time slot TS22, the transmission right is assigned to the relay station 30A and 30C. Thereafter, the same assignment of the transmission right is alternately iterated.

(Fourth Embodiment)

The assignment of transmission rights in a wireless relay system in accordance with the present embodiment will be shown.

Figure 9:
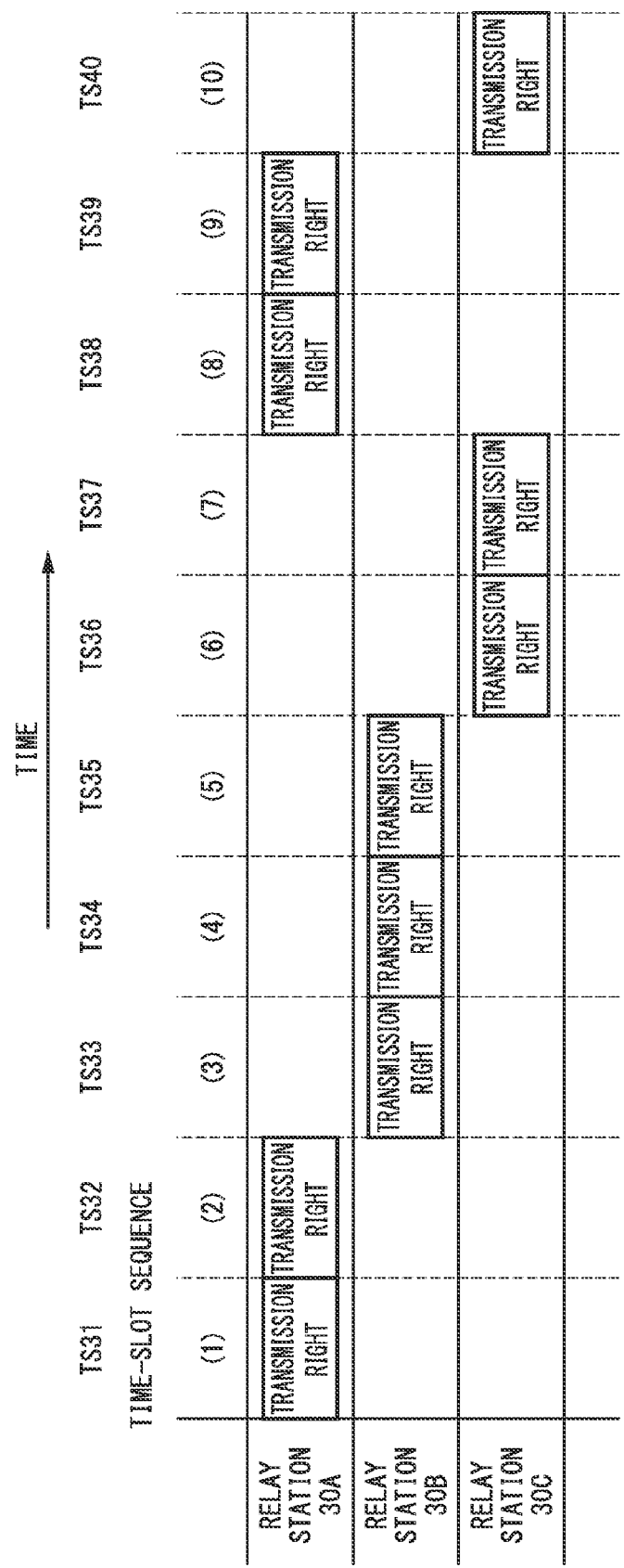
FIG. 9 is a timing chart illustrating the use of time slots of a wireless relay system in accordance with a fourth embodiment of the present invention.

FIG. 9 is a timing chart illustrating the use of time slots of the wireless relay system in accordance with the present embodiment.

Relay stations 30 illustrated in this drawing are controlled by a wireless relay scheme in which $n_i$ (where $n_i$ is a variable integer greater than or equal to 1) time slot(s) are allocated to an i-th relay station 30, transmission right(s) are assigned to permit transmission only for one relay station 30 during the allocated time slot(s), and an operation in which the transmission right(s) are sequentially assigned to the next relay station 30 in response to the passage of $n_i$ time slot(s) is iterated. In the present embodiment, even when there is a difference in traffic to be handled between the relay stations 30, it is possible to cope with average traffic fluctuations over a long term by controlling the number of allocated time slot(s) in accordance with the difference in traffic.

That is, in the embodiment shown in this drawing, the respective relay stations 30 are divided into independent groups, and one relay station 30 is included in each group.

A transmission right for transmission in a different time slot is assigned to each group, and one time slot is allocated to each group on a time-slot by time-slot basis.

The transmission right for permitting only one relay station 30 belonging to one group to perform transmission is assigned to the time slot, and transmission rights are assigned in accordance with order of transmission corresponding to the order of allocation of time slots.

(Fifth Embodiment)

The assignment of transmission rights in a wireless relay system in accordance with the present embodiment will be shown.

Figure 10:
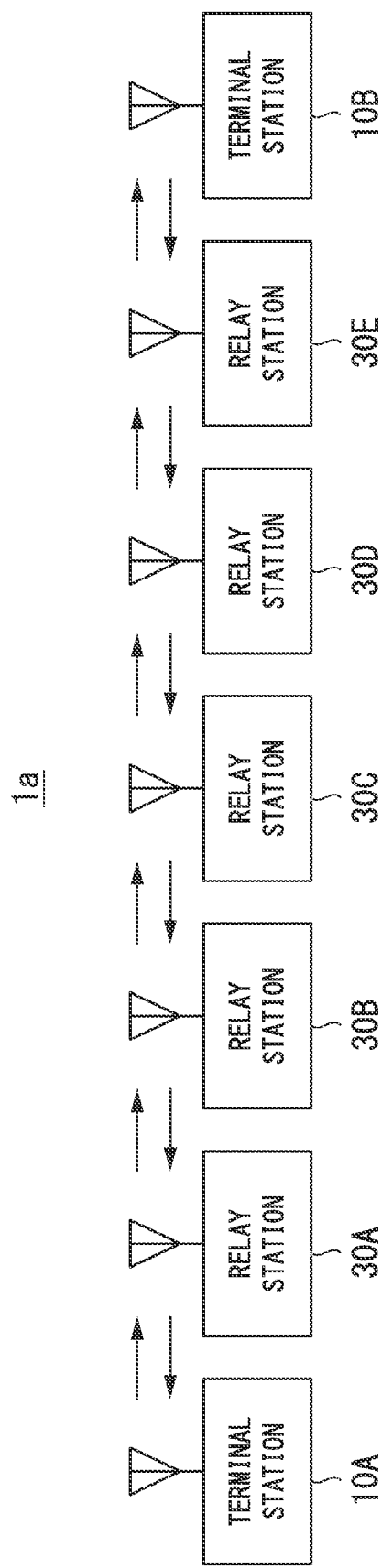
FIG. 10 is a configuration diagram illustrating a configuration of a wireless relay system in accordance with a fifth embodiment of the present invention.

FIG. 10 is a configuration diagram illustrating a configuration of the wireless relay system in accordance with the present embodiment.

A wireless relay system 1a illustrated in this drawing includes terminal stations 10A and 10B (also collectively referred to as terminal stations 10) and relay stations 30A, 30B, 30C, 30D, and 30E (also collectively referred to as relay stations 30). The same configuration as in FIG. 1 is denoted by the same reference symbol.

The relay stations 30A and 30E have the same configuration as the other relay stations 30B, 30C, and 30D, and perform communication between the terminal stations 10A and 10B in conjunction with the other relay stations 30B, 30C, and 30D.

In the relay stations 30, the timing control circuit 36 successively allocates time slots to which transmission rights are assigned when the number of time slots allocated to a group in a predetermined period is more than one.

Figure 11:
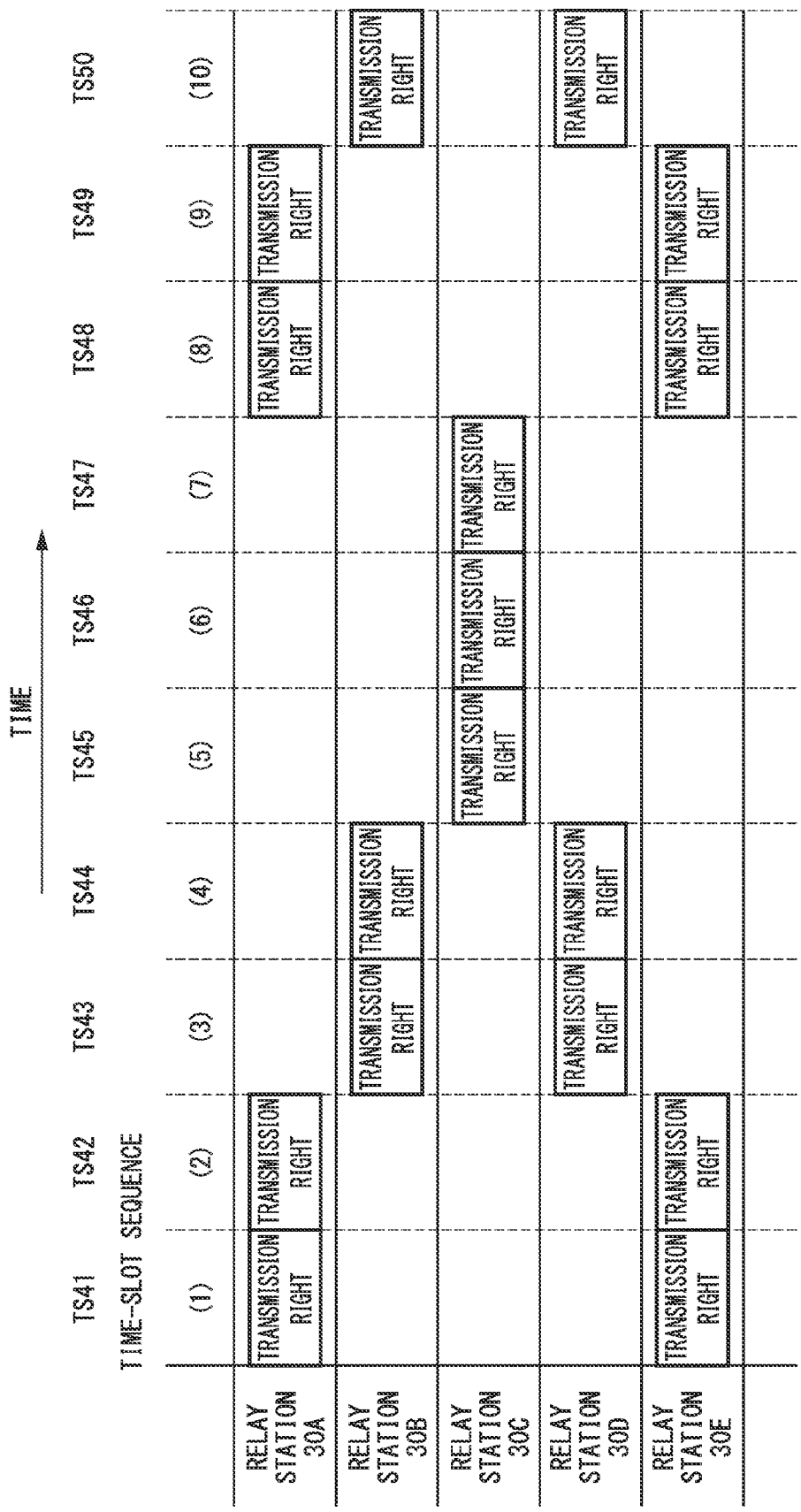
FIG. 11 is a timing chart illustrating the use of time slots of the wireless relay system in accordance with this embodiment.

FIG. 11 is a timing chart illustrating the use of time slots of the wireless relay system in accordance with the present embodiment.

The five relay stations 30 illustrated in this drawing are divided into three groups, and $n_j$ (where $n_j$ is a variable integer greater than or equal to 1) time slot(s) are allocated to a j-th group. The relay stations 30 are controlled by a wireless relay scheme in which transmission right(s) are assigned to permit transmission(s) only for one relay station 30 belonging to one group during the allocated time slot(s) and an operation in which transmission right(s) are sequentially assigned to each group whenever $n_j$ time slot(s) elapse is iterated. In the present embodiment, the five relay stations are grouped so that the relay stations 30A and 30E are grouped as a first group, the relay stations 30B and 30D are grouped as a second group, and the relay station 30C is allocated as a third group. In accordance with the present embodiment, even when there is a difference in traffic to be handled between the relay stations 30, it is possible to cope with average traffic fluctuations over a long term by controlling the number of allocated time slot(s) in accordance with the difference in traffic.

In the present embodiment, a transmission right for transmission in a different time slot is assigned to each group, and a plurality of time slots are allocated to each group allocated on a time-slot by time-slot basis.

A transmission right for permitting only the relay station 30 belonging to one group to perform transmission is assigned to the time slot, and transmission rights are assigned in accordance with the order of transmission corresponding to the order of allocation of time slots.

In the relay stations 30, the timing control circuit 36 successively allocates time slots to which transmission rights are assigned when the number of time slots allocated to a group is more than one in a predetermined period (for example, a time-slot sequence of TS41 to TS47).

(Sixth Embodiment)

The assignment of transmission rights in a wireless relay system in accordance with the present embodiment will be shown.

Figure 12:
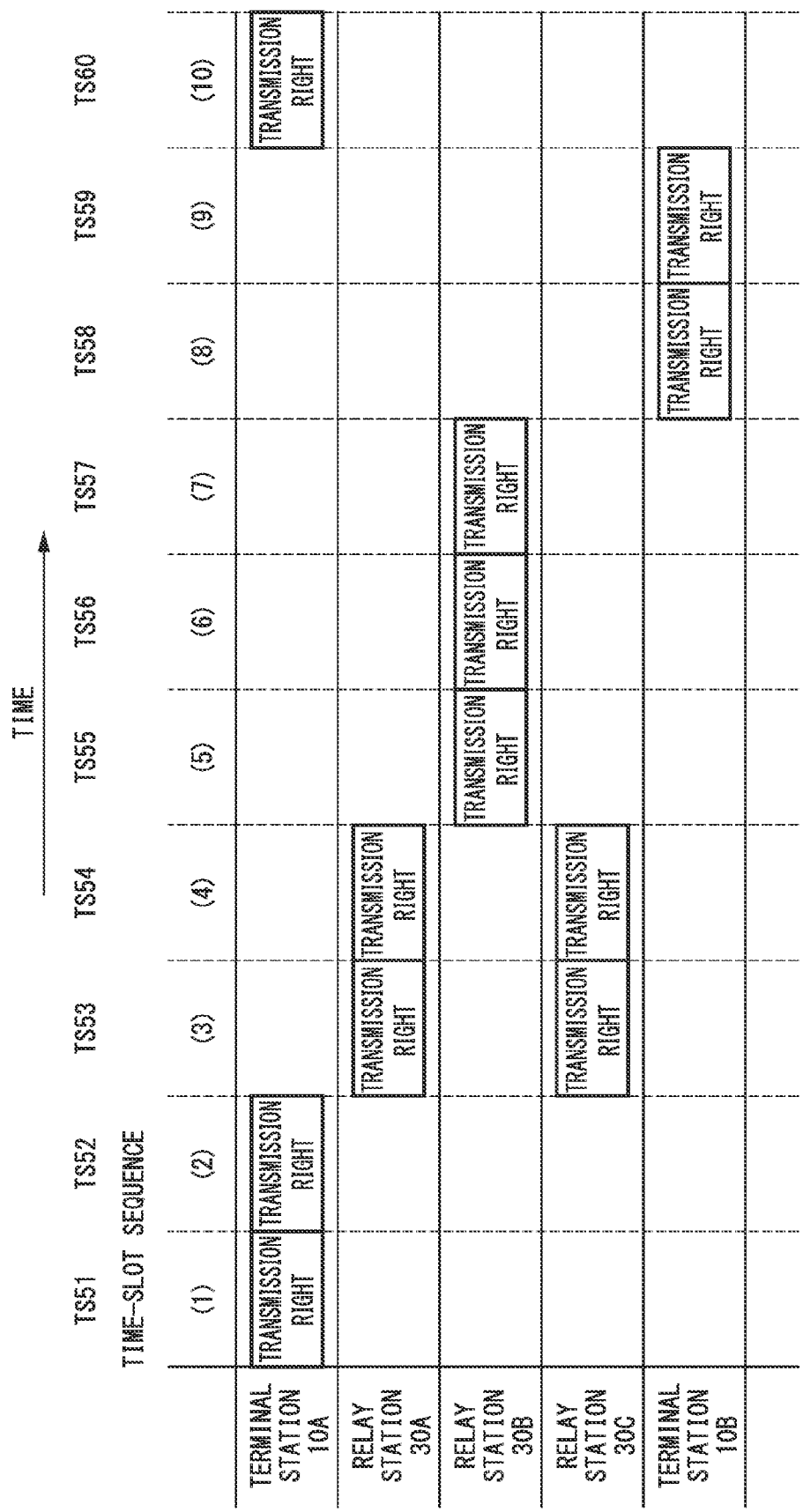
FIG. 12 is a timing chart illustrating the use of time slots of a wireless relay system in accordance with a sixth embodiment of the present invention.

FIG. 12 is a timing chart illustrating the use of time slots of the wireless relay system in accordance with the present embodiment.

Terminal stations 10 and three relay stations 30 illustrated in this drawing are divided into four groups. A terminal station 10A, relay stations 30A and 30C, a relay station 30B, and a terminal station 10B are configured as first to four groups. (2, 2, 3, and 2) time slots are allocated to these groups. The terminal stations 10 and the relay stations 30 are controlled by a wireless relay scheme in which a transmission right is assigned to permit transmission only for the terminal station 10 or the relay station(s) 30 belonging to one group during the allocated time slots and an operation in which transmission rights are sequentially assigned to each group whenever assigned time slots elapse is iterated. In accordance with the present embodiment, even when there is a difference in traffic to be handled between the relay stations 30, it is possible to cope with average traffic fluctuations over a long term by controlling the number of allocated time slots in accordance with the difference in traffic.

In the present embodiment, a transmission right for transmission in a different time slot is assigned to each group, and a plurality of time slots are allocated to each group allocated on a time-slot by time-slot basis.

A transmission right for permitting only the terminal station 10 or the relay station(s) 30 belonging to one group to perform transmission is assigned to the time slot, and transmission rights are assigned in accordance with the order of transmission corresponding to the order of allocation of time slots.

The timing control circuit 16 of the terminal stations 10 and the timing control circuit 36 of the relay stations 30 successively allocate time slots to which transmission rights are assigned when the number of times slots allocated to a group is more than one in a predetermined period (for example, a time-slot sequence of TS51 to TS59).

(Throughput)

As the first to sixth embodiments, 12 modes have been shown by combining the presence/absence of execution of network encoding with the embodiments between which the method for organizing the groups and the method for assigning transmission rights are different. Of these, the throughput in the first embodiment (the second embodiment) (collectively referred to as the present embodiment) will be shown using simulation results.

Figure 13:
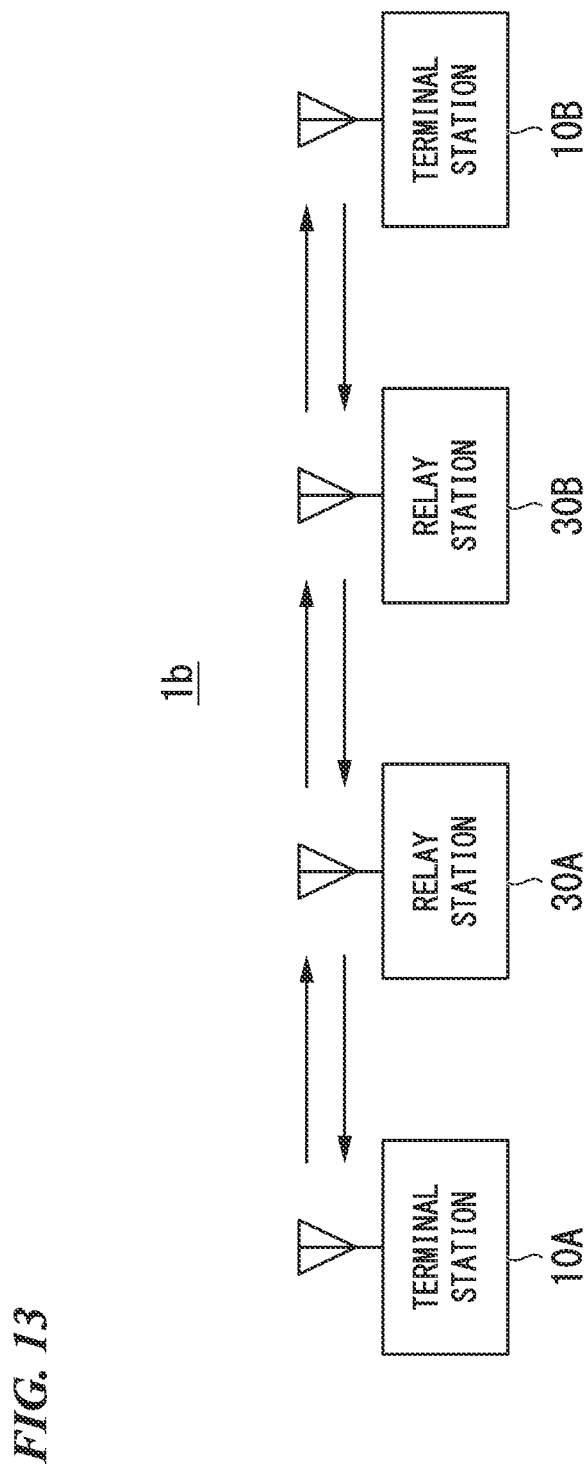
FIG. 13 is a schematic block diagram illustrating a configuration of a wireless relay system when simulations are performed in accordance with the respective embodiments of the present invention.

FIG. 13 is a schematic block diagram illustrating a configuration of a wireless relay system for which simulations are performed.

A wireless relay system 1b illustrated in this drawing is configured so that the number of relay stations 30 is one less than in the wireless relay system 1 illustrated in FIG. 1. That is, a configuration excluding the relay station 30C is shown. It is to be noted that the same configuration as in FIG. 1 is denoted by the same reference symbol.

In the following simulations, the slotted ALOHA scheme is adopted as a random-access MAC protocol, and a wireless relay system in which communication is performed between terminal stations 10A and 10B, which are wireless stations between two points between which radio waves do not reach, via two relay stations 30A and 30B is used as a model. The simulation results compared to those of the conventional scheme will be shown.

Figure 14:
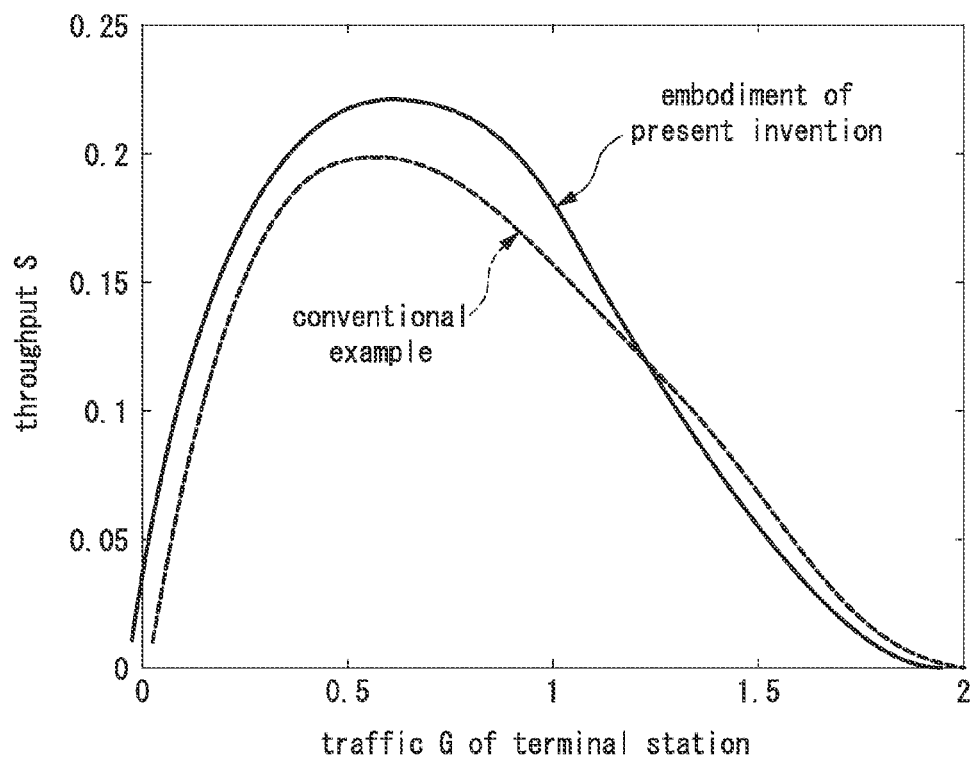
FIG. 14 is a diagram illustrating simulation results of throughput in the wireless relay system illustrated in FIG. 13.

FIG. 14 illustrates simulation results of throughput in the wireless relay system illustrated in FIG. 13.

The simulation results illustrated in this drawing show results on the condition that no network encoding is performed.

In this graph, the horizontal axis represents traffic G that occurs in accordance with a Bernoulli process in each terminal station 10, and the vertical axis represents throughput S indicating how many packets reach a destination node per unit slot.

As illustrated in this graph, in the present embodiment, when a traffic amount of the terminal station 10 is 0.7, a peak value of throughput can be 0.22. As compared to a conventional method, it can be seen that there is improvement over the total range of the traffic amount and there is improvement from a peak value (0.2) of the throughput of the conventional method.

From these results, it can be seen that in accordance with the configuration shown in the first embodiment (or the second embodiment), packet collisions between relay stations 30 are completely eliminated and throughput is significantly improved on the condition that no network encoding is performed, as compared to the conventional scheme.

Because the third, fourth, fifth, and sixth embodiments similarly employ a scheme which reduces packet collisions between the terminal stations 10 and the relay stations 30 on the condition that no network encoding is performed, throughput performance can be improved similarly to the first embodiment (or the second embodiment) on the condition that no network encoding is performed.

Figure 15:
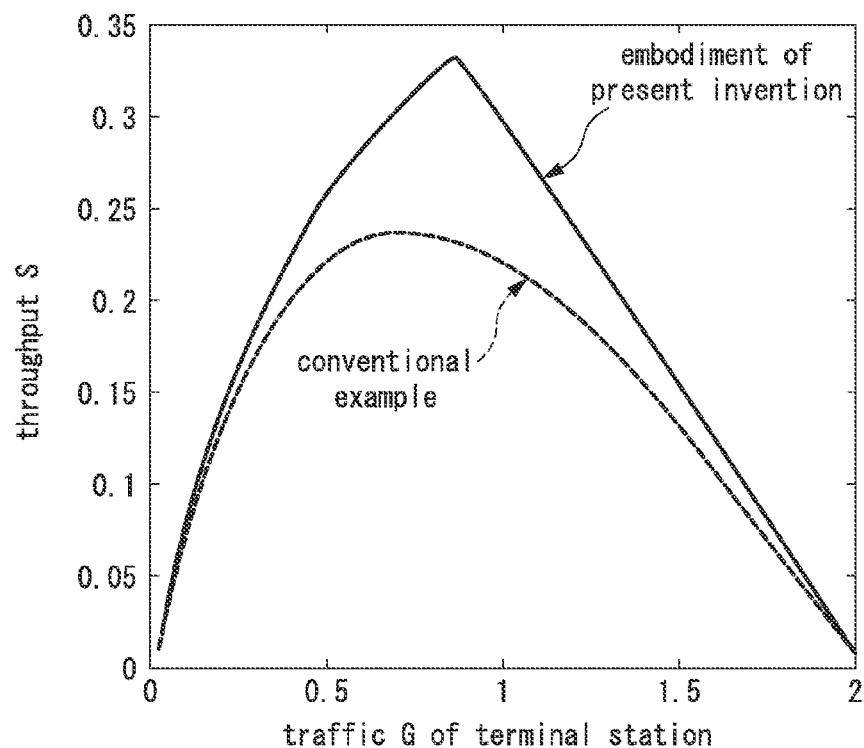
FIG. 15 is a diagram illustrating simulation results of throughput in the wireless relay system illustrated in FIG. 13.
Figure 16:
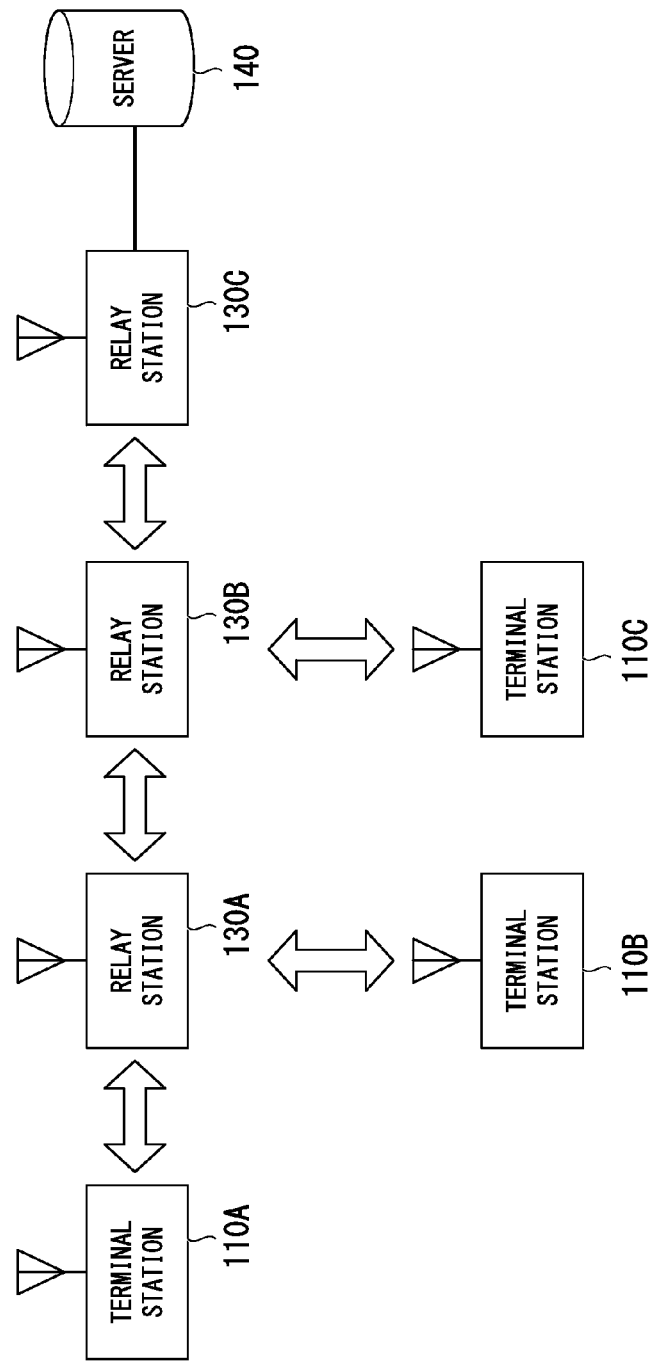
FIG. 16 is a diagram illustrating an example of a configuration of a wireless relay system in accordance with the background art.
Figure 18:
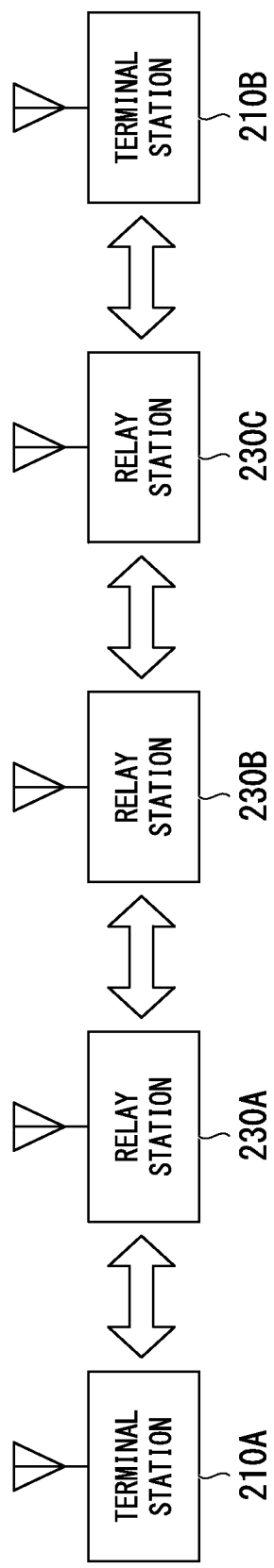
FIG. 18 is a diagram illustrating an example of a configuration of a wireless relay system in accordance with the background art.
Figure 19:
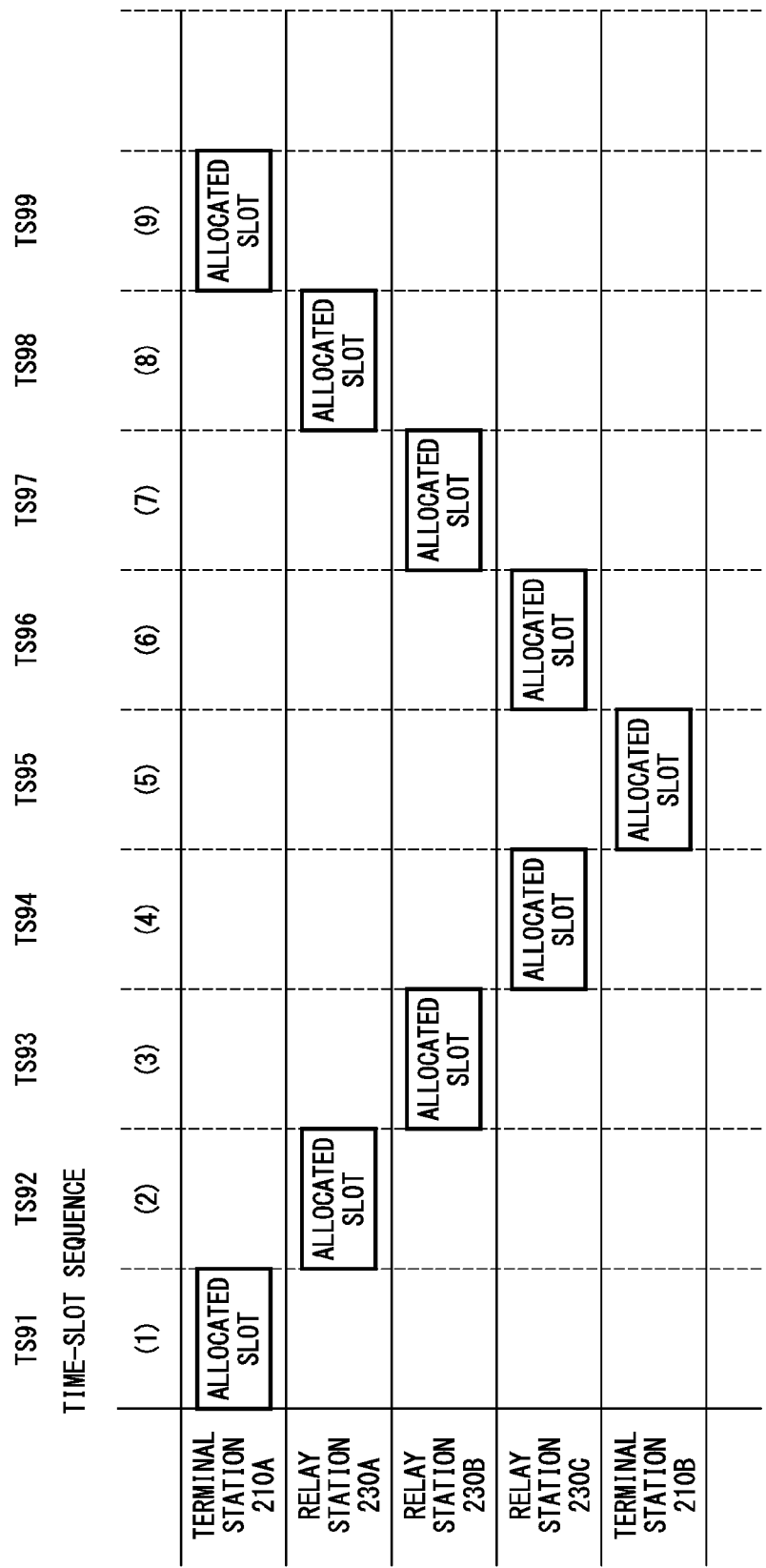
FIG. 19 is a diagram illustrating time-slot control in accordance with the background art.

FIG. 15 illustrates simulation results of throughput in the wireless relay system illustrated in FIG. 13.

The simulation results illustrated in this drawing show results on the condition that network encoding is performed.

In this graph, the horizontal axis represents traffic G that occurs in accordance with a Bernoulli process in each terminal station 10, and the vertical axis represents throughput S indicating how many packets reach a destination node per unit slot.

As illustrated in this graph, in the present embodiment, when a traffic amount of the terminal station 10 is 0.8, a peak value of throughput can be 0.34. As compared to a conventional method, it can be seen that there is improvement over the total range of the traffic amount and there is improvement from a peak value (0.23) of the throughput of the conventional method.

From these results, it can be seen that in accordance with the configuration shown in the first embodiment (or the second embodiment), packet collisions between relay stations 30 are completely eliminated and throughput is significantly improved on the condition that network encoding is performed, as compared to the conventional scheme.

Because the third, fourth, fifth, and sixth embodiments similarly employ a scheme which reduces packet collisions between the terminal stations 10 and the relay stations 30 on the condition that the network encoding is performed, throughput performance can be improved similarly to the first embodiment (or the second embodiment) on the condition that network encoding is performed.

As described above, the wireless relay systems 1, 1a, and 1b use the relay stations 30 for communication between the two terminal stations 10 that perform random access. The transmitter 12 (32) and the receiver 14 (34) synchronize slot timing of a time slot indicating a unit time. The timing control circuit 16 (36) performs time synchronization for synchronizing the slot timing. In accordance with transmission rights for permitting transmissions using time slots, at least the relay stations 30 among the terminal stations 10 and the relay stations 30 are divided into a plurality of groups, at least one time slot is allocated to each group, and a transmission right permitting only a terminal station 10 or relay station(s) 30 belonging to one group to perform transmission is assigned to a time slot. The timing control circuit 16 (36) assigns a transmission right to a group in accordance with the order of transmission corresponding to the order of allocation of time slots.

Thereby, the wireless relay systems 1, 1a, and 1b can improve system throughput between the terminal stations 10, and flexibly make system throughput variable with respect to short-term traffic fluctuations.

In addition, the timing control circuit 16 (36) successively allocates time slots to which transmission rights are assigned when the number of time slots allocated to a group is more than one.

Thereby, it is possible to successively transmit a plurality of time slots allocated to a group in accordance with transmission rights. Therefore, it is possible to improve system throughput between the terminal stations 10 by controlling order of transmission without having to perform a complex process, and flexibly make system throughput variable with respect to short-term traffic fluctuations.

In addition, the timing control circuit 16 (36) alternately allocates time slots to which transmission rights are assigned in accordance with the number of relay stages by the relay stations 30 when there are two groups and the number of time slots allocated to a group is one.

Thereby, if the number of groups is two and the number of allocated time slots is one, it is possible to alternately assign transmission rights in accordance with the number of stages of the relay stations and it is easy to determine a time slot in which transmission is performed from the number of relay stages. Thereby, it is possible to improve system throughput between the terminal stations 10 and flexibly make system throughput variable with respect to short-term traffic fluctuations.

In addition, the relay station 30 includes the encoding unit 32a, which performs network encoding of a packet to be transmitted using a time slot, and the terminal station 10 and the relay station 30 include the decoding unit 14a and the decoding unit 34a, respectively, which decode packets subjected to a network encoding process based on their transmitted packets.

Thereby, it can be applied to wireless relay systems which perform the network encoding, and throughput can be further improved by the network encoding.

Furthermore, it is possible to improve system throughput between the terminal stations 10 by limiting the number of contending stations and allocating slots so as to decrease the probability of packet collisions between the relay stations 30 and/or the terminal stations 10 which perform random access, and it is possible to provide a wireless relay scheme that flexibly makes system throughput variable with respect to short-term traffic fluctuations of the terminal stations 10 while reducing the deterioration of the system throughput by limiting the number of contending stations in accordance with average traffic.

While embodiments of the present invention have been described with reference to the drawings, specific configurations are not limited to these embodiments, and designs (additions, omissions, substitutions, and other modifications) can be made without departing from the gist of the present invention. For example, the aforementioned embodiments may be appropriately combined with each other. Accordingly, the present invention is not to be considered as being limited by the foregoing description, and is only limited by the scope of the appended claims.

INDUSTRIAL APPLICABILITY

For example, the present invention is used for a digital wireless-relay communication system in which random access is used as a basic media access control scheme. With the present invention, it is possible to decrease the collision probability of packet signals due to media access control between relay stations and improve system throughput when communication is performed between terminal stations via multistage relay stations.

DESCRIPTION OF REFERENCE SYMBOLS

10 Terminal station
12 Transmitter
14a Decoding unit
15 GPS circuit
16 Timing control circuit
30 Relay station
32 Transmitter
32a Encoding unit
34a Decoding unit
35 GPS circuit
36 Timing control circuit

The invention claimed is:

1. A wireless relay system in which a plurality of relay stations relay communication between two terminal stations that perform random access,
wherein the terminal stations and the relay stations comprise:
a slot synchronization circuit which synchronizes slot timing of a time slot indicating a unit time; and
the relay stations comprise a time synchronization circuit which performs time synchronization for synchronization of the slot timing,
a transmitter which transmits a transmission packet to a wireless line in synchronization with the slot timing,
wherein a transmission right is allocated for at least one time slot to each of a plurality of groups in which a group of a relay station and a group of an adjacent relay station are different from each other,
transmission rights in different time slots are assigned to different groups,
the transmitter of the relay station transmits the transmission packet to the wireless line only in a time slot in which the transmission right is allocated to the group to which the relay station belongs,
transmission rights in part of time slots assigned to all the groups are assigned to the relay station,
the relay station performs random access on a time slot basis only in the time slots in which the transmission rights are assigned to the relay station,
no transmission right is assigned to the terminal stations in advance, and
the terminal stations perform random access in every time slot when transmission traffic is generated in the terminal stations.

2. The wireless relay system according to claim 1, wherein when the number of time slots allocated to the group is more than one, time slots to which transmission rights are assigned are successively allocated.

3. The wireless relay system according to claim 1, wherein the number of groups is two, and
when the number of time slots allocated to each of the groups is one, a time slot to which a transmission right is assigned is alternately allocated in accordance with the number of relay stages by the relay stations.

4. The wireless relay system according to claim 1, wherein the relay stations comprise an encoder which performs network encoding of a packet to be transmitted using the time slot, and
the terminal stations and the relay stations comprise a decoder which decodes a packet subjected to the network encoding based on the packet transmitted by the terminal stations themselves or the relay stations themselves.

5. An access control method in a wireless relay system in which a plurality of relay stations relay communication between two terminal stations that perform random access, the method comprising:
a slot synchronization process of synchronizing, by the terminal stations and the relay stations, slot timing of a time slot indicating a unit time;
a time synchronization process of performing, by relay stations, time synchronization for synchronization of the slot timing; and
a transmission process of transmitting, by the terminal stations and the relay stations, a transmission packet to a wireless line in synchronization with the slot timing,
wherein a transmission right is allocated for at least one time slot to each of a plurality of groups which are configured so that a group of a relay station and a group of an adjacent relay station are different from each other,
transmission rights in different time slots are assigned to different groups,
in the transmission process, the transmission packet is transmitted to the wireless line only in a time slot in which the transmission right is allocated to the group to which the relay station belongs,
transmission rights in part of time slots assigned to all the groups are assigned to the relay station,
the relay station performs random access on a time slot basis only in the time slots in which the transmission rights are assigned to the relay station,
no transmission right is assigned to the terminal stations in advance, and
the terminal stations perform random access in every time slot when transmission traffic is generated in the terminal stations.

6. The access control method according to claim 5, wherein when the number of time slots allocated to the group is more than one, time slots to which transmission rights are assigned are successively allocated.

7. The access control method according to claim 5, wherein the number of groups is two, and
when the number of time slots allocated to each of the groups is one, a time slot to which a transmission right is assigned is alternately allocated in accordance with the number of relay stages by relay stations.

8. The access control method according to claim 5, comprising:
an encoding process of performing, by the relay stations, network encoding of a packet to be transmitted using the time slot; and
a decoding process of decoding, by the terminal stations and the relay stations, a packet subjected to the network encoding based on the packet transmitted by the terminal stations themselves or the relay stations themselves.

* * * * *